United States Patent
Wakabayashi

(10) Patent No.: US 6,912,248 B1
(45) Date of Patent: Jun. 28, 2005

(54) EQUALIZER CIRCUIT AND EQUALIZING

(75) Inventor: Yasuhiko Wakabayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/546,184

(22) Filed: Apr. 10, 2000

(30) Foreign Application Priority Data

Apr. 14, 1999 (JP) .......................................... 11/106034

(51) Int. Cl.$^7$ .............................. H03D 7/16; H03H 7/30
(52) U.S. Cl. ........................ 375/229; 375/232; 375/233
(58) Field of Search .................................. 375/229, 231, 375/233, 321, 346, 347, 349, 232; 379/340; 333/18, 28 R; 708/322, 323

(56) References Cited

U.S. PATENT DOCUMENTS

| | | | | |
|---|---|---|---|---|
| 4,097,806 A | * | 6/1978 | Evans | .......................... 375/231 |
| 5,115,454 A | * | 5/1992 | Kucar | .......................... 375/321 |
| 5,563,911 A | * | 10/1996 | Uesugi et al. | ............... 375/232 |
| 5,694,424 A | * | 12/1997 | Ariyavisitakul | .............. 375/233 |
| 5,710,792 A | * | 1/1998 | Fukawa et al. | .............. 375/229 |
| 6,002,724 A | * | 12/1999 | Kaku et al. | .................. 375/326 |
| 6,229,950 B1 | * | 5/2001 | Kobayashi et al. | ........... 386/47 |
| 6,252,630 B1 | * | 6/2001 | Kusumi et al. | ............. 348/460 |

FOREIGN PATENT DOCUMENTS

| | | |
|---|---|---|
| JP | 63-43425 | 2/1988 |
| JP | 6-30057 | 2/1994 |
| JP | 9-107313 | 4/1997 |

* cited by examiner

*Primary Examiner*—Young T. Tse
*Assistant Examiner*—Edith Chang
(74) *Attorney, Agent, or Firm*—Foley & Lardner LLP

(57) ABSTRACT

An equalizer circuit includes a carrier sensor, first and second equalizer units, carrier sense controller, and reception signal switching unit. The carrier sensor senses the start of a reception signal on the basis of a signal representing the reception level of the reception signal. The first and second equalizer units equalize the reception signal. The carrier sense controller alternately enables the first and second equalizer units every frame reception in accordance with an output from the carrier sensor. The reception signal switching unit alternately switches between outputs from the first and second equalizer units every frame reception and outputs the selected output as demodulation data.

14 Claims, 5 Drawing Sheets

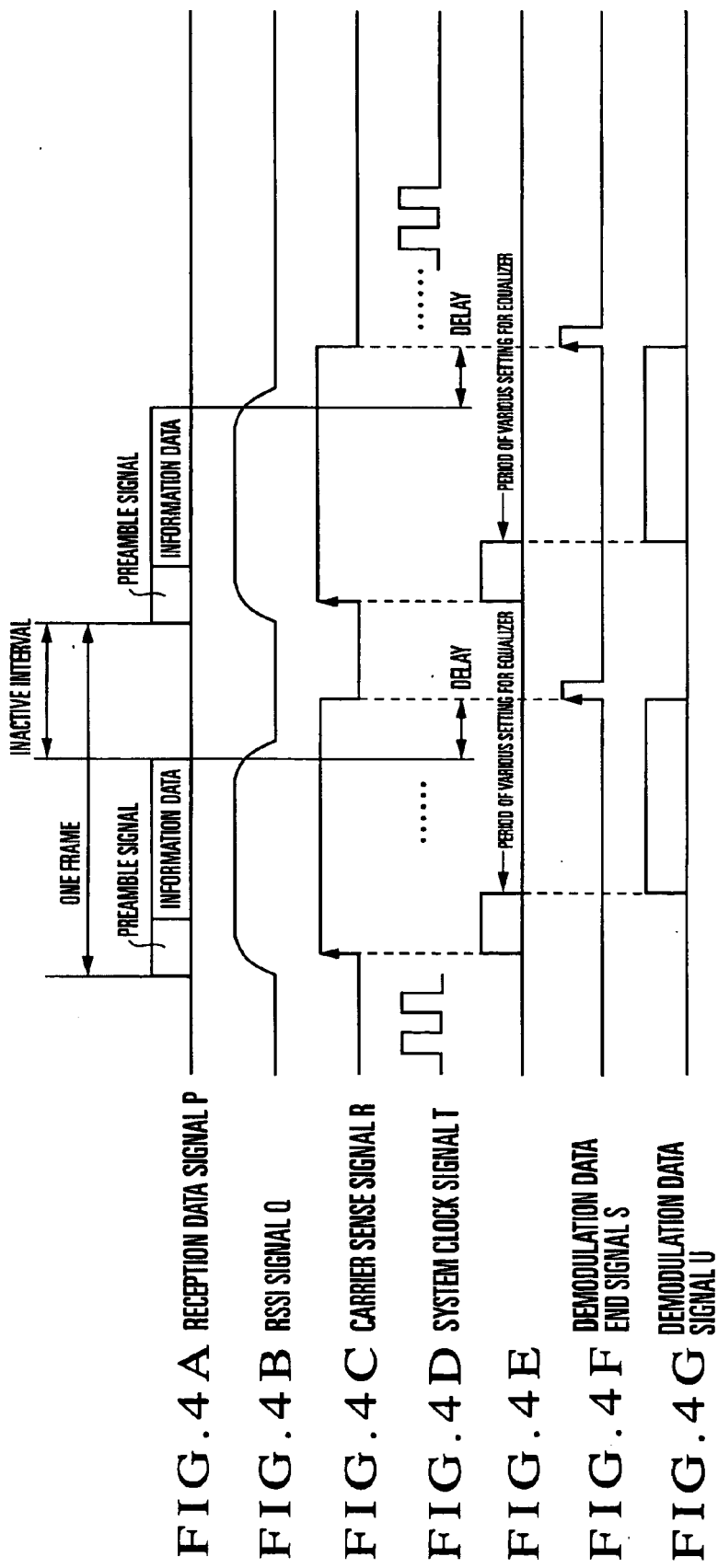

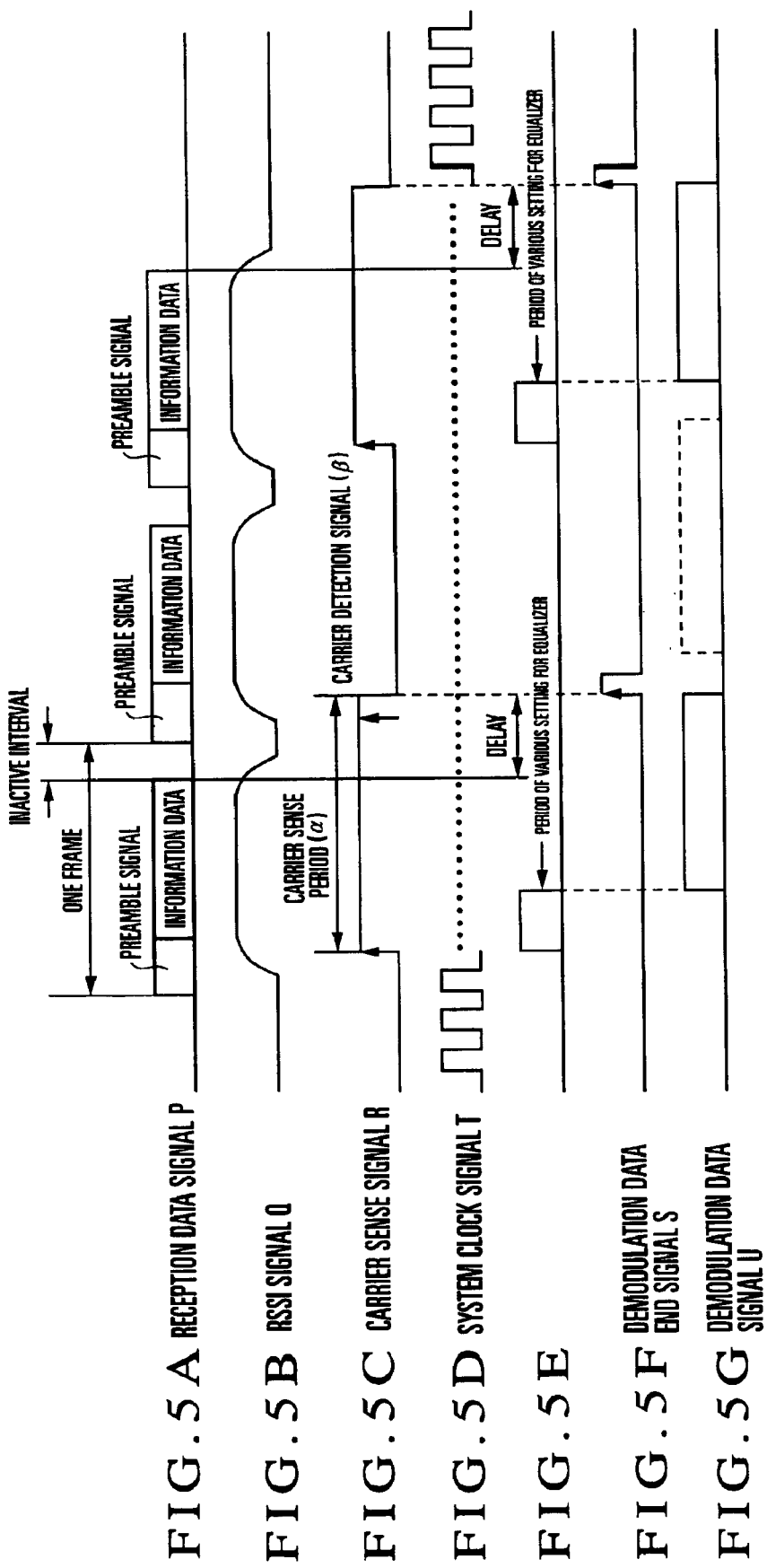

EQUALIZER CIRCUIT AND EQUALIZING

BACKGROUND OF THE INVENTION

The present invention relates to an equalizer circuit and equalizing method and, more particularly, to an equalizer circuit and equalizing method for preventing waveform distortion and interference waves (noise) in multipath fading.

In data transmission of a high-speed radio ATM (Asynchronous Transfer Mode) system for multimedia mobile communication of 20 to 30 Mbps using a 5.2-GHz band, an equalizing function is used to prevent data quality degradation in multipath fading.

A technique using this equalizing function has been proposed by the present applicant/assignee. This technique proposes a radio data communication terminal for narrow-band modulation system, in which a tap coefficient for an equalizer is set after a frequency offset value for operating a phase rotation means is obtained using, e.g., a shortest preamble.

As shown in FIG. 3, the equalizer circuit for performing the above equalizing function comprises a carrier sensor 6 for sensing the presence/absence of an input carrier and an equalizer unit 7 for receiving an output from the carrier sensor 6. The equalizer unit 7 is comprised of a memory unit 8, phase rotation unit 9, phase difference detector 10, average value detector 11, integrator 12, vector converter 13, transmission line characteristic estimating unit 14, a tap coefficient setting unit 15, and equalizer 16.

The carrier sensor 6 senses the presence/absence of a carrier in accordance with an RSSI (Received Signal Strength Indicator) signal Q representing the reception level from an RF (Radio Frequency) converter (not shown). The carrier sensor 6 then detects the start of a reception signal and outputs a carrier sense signal R to the equalizer unit 7 for a time interval from a time when detecting the start of reception data to a time when receiving a demodulation data end signal S of a one-pulse signal for stopping the equalizer unit 7.

The memory unit 8 receives a reception data signal P for an arbitrary period to control the output. The phase rotation unit 9 rotates the phase of the output signal from the memory unit 8 through a necessary angle. The phase difference detector 10 obtains the current angle and the angle of a PN (Pseudo Noise) code sequence obtained upon the lapse of one period. The phase difference detector 10 then obtains the difference between these two angles.

The average value detector 11 integrates the phase difference from the phase difference detector 10 a predetermined number of times. The average value detector 11 then divides the integrated value by the predetermined number of times to obtain the average value of the average phase difference per symbol. The integrator 12 integrates the average value from the average value detector 11 in units of symbols. The vector converter 13 converts the output from the integrator 12 into a real part amplitude value and an imaginary part amplitude value. The vector converter 13 outputs these amplitude values to the phase rotation unit 9.

The transmission line characteristic estimating unit 14 obtains the transmission line characteristics of the one-period PN code sequence for a preamble period using the signal obtained upon phase rotation in the phase rotation unit 9. The tap coefficient setting unit 15 obtains a tap coefficient necessary for the equalizer 16 in accordance with the transmission line characteristics obtained by the transmission line characteristic estimating unit 14. The tap coefficient setting unit 15 then sets the tap coefficient in the equalizer 16. The equalizer 16 equalizes the output from the phase rotation unit 9 using a filter having the tap coefficient set by the tap coefficient setting unit 15. The equalizer 16 outputs a demodulation data signal U. Reception processing is performed using this demodulation data signal U.

FIGS. 4A to 4F show the reception timings of a conventional phase shifter circuit shown in FIG. 3. In this case, the inactive interval of the reception data signal P is long.

The carrier sensor 6 determines the presence/absence of a carrier in accordance with the RSSI signal Q from the RF converter (FIG. 4B). The carrier sensor 6 then outputs the carrier sense signal R representing the start of the reception data signal P to the equalizer unit 7 (FIGS. 4A and 4C). Upon detecting the start of the reception data signal P, the equalizer unit 7 detects the frequency offset, estimates the transmission line characteristics, and sets the tap coefficient.

The equalizer 16 stores the preamble signal having the repeated PN code in the memory unit 8 and performs processing for a period of various initial settings (FIG. 4E) and has a delay accordingly. Upon completion of various initial settings in the equalizer 16, the demodulation data signal U is output (FIG. 4G). Upon completion of demodulation, the demodulation data end signal S is output to the carrier sensor 6 (FIG. 4F). At this time, the equalizer unit 7 is always operating in response to a system clock signal T (FIG. 4D) and therefore consumes power. In addition, a long inactive interval decreases the information bit rate.

FIGS. 5A to 5G show the reception timings of the conventional phase shifter circuit shown in FIG. 3. This exemplifies a short inactive interval of the reception data signal P.

The carrier sensor 6 determines the presence/absence of a carrier in accordance with the RSSI signal Q from the RF converter (FIG. 5B) and outputs the carrier sense signal R representing the start of the reception data signal P to the equalizer unit 7 (FIGS. 5A and 5C). The equalizer unit 7 detects a frequency offset, estimates the transmission line characteristics, and sets the tap coefficient upon detecting the start of the reception data signal P.

The equalizer 16 stores the preamble signal having the repeated PN code in the memory unit 8 and performs processing for a period of various initial settings (FIG. 5E) and has a delay accordingly. Upon completion of various initial settings in the equalizer 16, the demodulation data signal U is output (FIG. 5G). Upon completion of demodulation, the demodulation data end signal S is output to the carrier sensor 6 (FIG. 5F). At this time, the equalizer unit 7 is always operating in response to a system clock signal T (FIG. 5D) and therefore consumes power.

Since the inactive interval of the reception data signal P is short, a carrier detection signal β representing the leading edge of the carrier sense signal R cannot be detected upon receiving the next frame during a carrier sense period α. Therefore, the reception operation is performed every other frame, and the demodulation data signal U cannot normally be output.

In the above conventional equalizer circuit, a long inactive interval undesirably decreases the information bit rate. When the next frame is received during the processing period of the demodulation data with a short inactive interval, the carrier sense signal cannot be detected. Data is received every other frame, resulting in a reception error.

Since the equalizer unit is always operating in response to the system clock signal, wasteful power is undesirably consumed.

SUMMARY OF THE INVENTION

It is an object of the present invention to provide an equalizer circuit and equalizing method capable of normally performing real-time processing even upon receiving a continuous burst signal.

It is another object of the present invention to provide an equalizer circuit and equalizing method which can reduce power consumption.

In order to achieve the above object of the present invention, there is provided an equalizer circuit comprising carrier sensing means for sensing the start of a reception-signal on the basis of a signal representing a reception level of the reception signal, first and second equalizing means for equalizing the reception signal, control means for alternately enabling the first and second equalizing means every frame reception in accordance with an output from the carrier sensing means, and switching means for alternately switching between outputs from the first and second equalizing means every frame reception and outputting the selected output as demodulation data.

BRIEF DESCRIPTION OF THE DRAWINGS

FIGS. 4A to 4G are timing charts of conventional operation for a long inactive interval; and FIGS. 5A to 5G are timing chats of conventional operation for a short inactive interval.

DESCRIPTION OF THE PREFERRED EMBODIMENT

The present invention will be described in detail with reference to the accompanying drawings.

Figure 1:
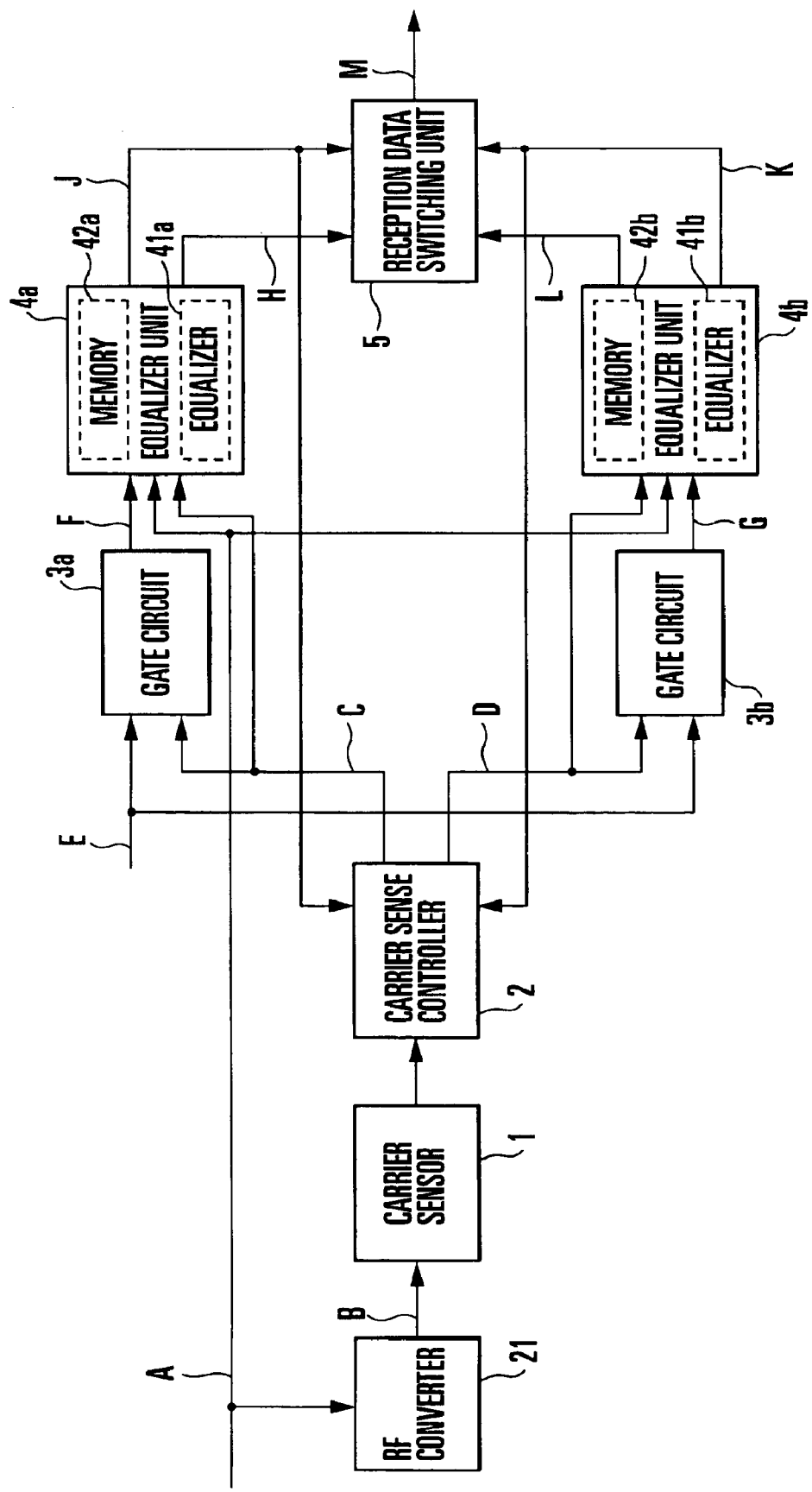
FIG. 1 is a block diagram of an equalizer circuit according to an embodiment of the present invention.

FIG. 1 shows an equalizer circuit according to an embodiment of the present invention. Referring to FIG. 1, the equalizer circuit of this embodiment is comprised of a carrier sensor 1 for detecting the carrier of an input signal, a carrier sense controller 2 for receiving an output from the carrier sensor 1, gate circuits 3a and 3b for receiving an output from the carrier sense controller 2, an equalizer unit 4a for receiving a reception data signal A and outputs from the carrier sense controller 2 and gate circuit 3a, an equalizer unit 4b for receiving the reception data signal A and the outputs from the carrier sense controller 2 and gate circuit 3b, and a reception data switching unit 5 for receiving outputs from the equalizer units 4a and 4b and outputting a demodulation data signal M. Gate signals from the equalizer units 4aand 4b are output to the carrier sense controller 2.

The carrier sensor 1 detects the start of the reception data in accordance with an RSSI signal B from an RF converter 21 and outputs a signal representing this start to the carrier sense controller 2. The carrier sense controller 2 determines the start of reception data in accordance with a signal from the carrier sensor 1 and detects the end of carrier sensing on the basis of demodulation data gate signals J and K respectively from the equalizer units 4a and 4b.

At the start and end of carrier sensing, the carrier sense controller 2 generates active-high carrier sense signals C and D for low-power consumption and real-time processing every other frame. The carrier sense controller 2 outputs the carrier sense signal C to the gate circuit 3a and equalizer unit 4a and the carrier sense signal D to the gate circuit 3b and equalizer unit 4b. The carrier sense signals C and D serve as enable signals for the equalizer units 4a and 4b.

The gate circuit 3a masks a system clock signal E and the carrier sense signal C and outputs an active-high clock gate signal F to the equalizer unit 4a. The gate circuit 3b masks the system clock signal E and the carrier sense signal D and outputs an active-high clock gate signal G to the equalizer unit 4b.

The equalizer unit 4a detects the frequency An offset, estimates the transmission line characteristics, and sets the tap coefficient upon receiving the carrier sense signal C. The equalizer unit 4a outputs the demodulation data gate signal J and the demodulation data signal H to the reception data switching unit 5 upon initial setting of an internal equalizer 41a.

The equalizer unit 4b detects the frequency offset, estimates the transmission line characteristics, and sets the tap coefficient upon receiving the carrier sense signal D. The equalizer unit 4b outputs the demodulation data gate signal K and the demodulation data signal L to the reception data switching unit 5 upon initial setting of an internal equalizer 41b.

The reception data switching unit 5 alternately receives the demodulation data gate signal J from the equalizer unit 4a and the demodulation data gate signal K from the equalizer unit 4b. The reception data switching unit 5 switches (selects) between the demodulation data signal H from the equalizer unit 9a and the demodulation data signal L from the equalizer unit 4b in response to the demodulation data gate signals J and K and outputs the selected demodulation data signal as the demodulation data signal M. Reception processing is performed in accordance with the demodulation data signal M from the reception data switching unit 5.

Figure 2:
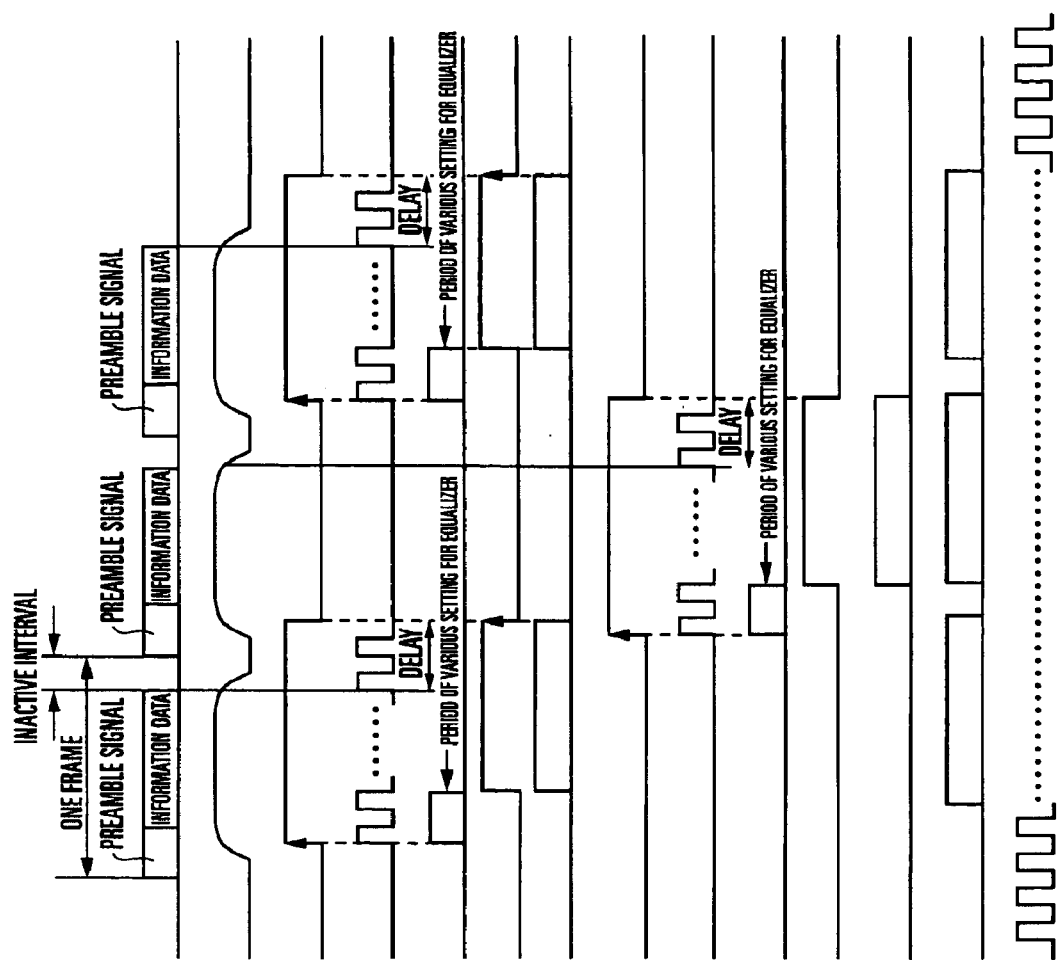
FIGS. 2A to 2N are timing charts showing operation of switching two parallel equalizers according to the embodiment shown in FIG. 1.
Figure 3:
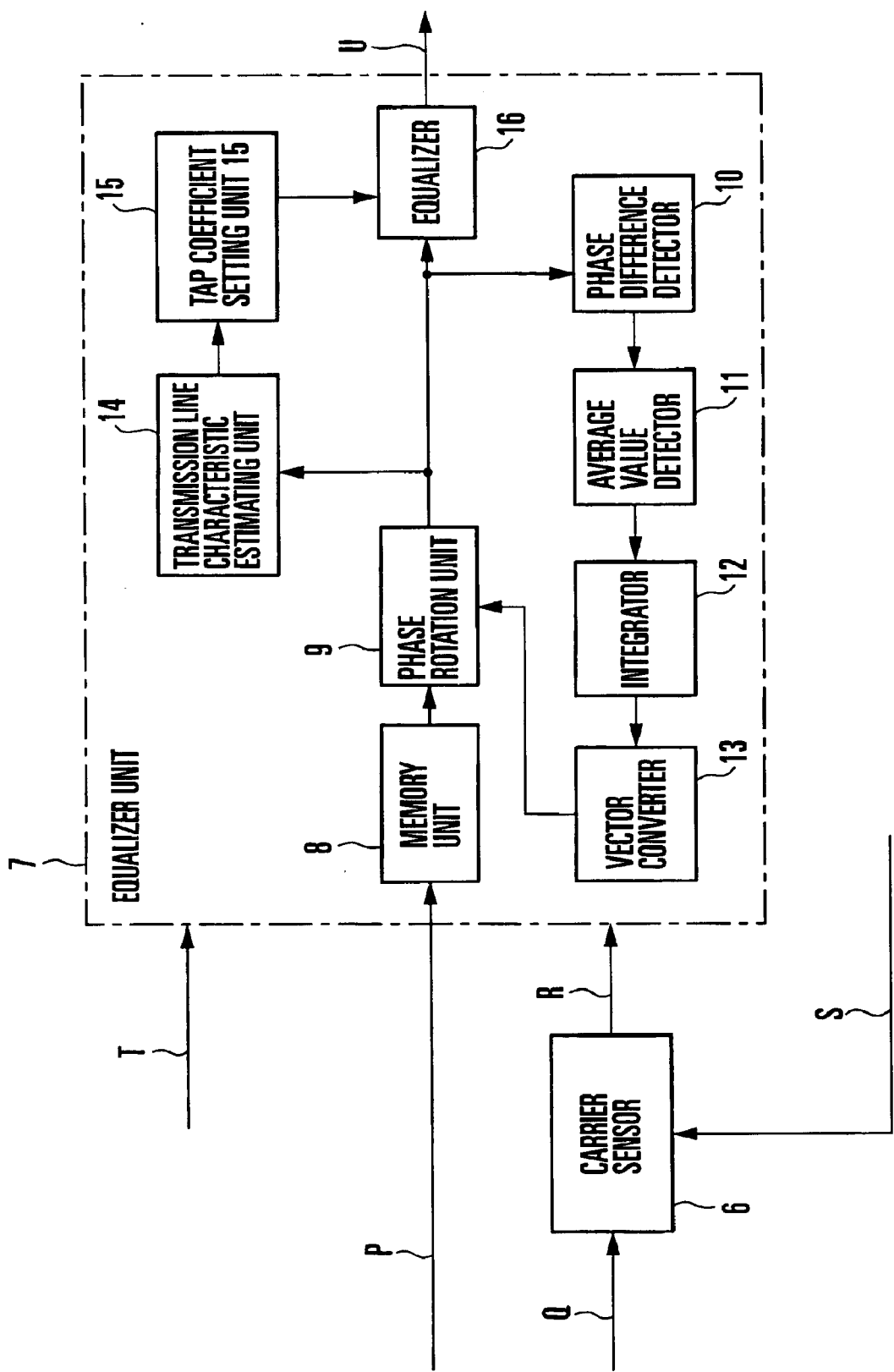
FIG. 3 is a block diagram of a conventional equalizer circuit.

FIGS. 2A to 2N show the switching operation for the two parallel equalizers shown in FIG. 1. The reception data signal A is made up of preamble signals for performing various training operations and information data, as shown in FIG. 2A.

The preamble signals are received by repeating a PN code for a predetermined period. The carrier sensor 6 determines the presence/absence of a carrier in accordance with the RSSI signal B from the RF converter 21 (FIG. 2B). The carrier sensor 6 then outputs the carrier sense signals C and D representing the start of the reception data signal A to the gate circuits 3a and 3b and equalizer units 4a and 4b (FIGS. 2C and 2H). Upon outputting the carrier sense signals C and D from the carrier sense controller 2, the equalizer units 4aand 4b detect the frequency offset values, estimate the transmission line characteristics, and set the tap coefficients using a PN-code one-period signal.

The equalizer units 4a and 4b store the PN codes in an internal memory 42a during the respective initial setting periods (FIGS. 2E and 2J) and has delays accordingly. At the end of the demodulation data signals H and L from the equalizer units 4a and 4b, the carrier sense controller 2 stops outputting the carrier sense signals C and D, as will be described later.

The operation of the gate circuits 3a and 3b, equalizer units 4a and 4b, and reception data switching unit 5 will now be described in detail below.

The gate circuits 3a and 3b control to gate the system clock signal E using the carrier sense signals C and D as gate signals (FIGS. 2C, 2H, and 2N). While receiving the carrier sense signals C and D, the gate circuits 3a and 3b output the clock gate signals F and G (FIGS. 2D and 2I). While receiving the carrier sense signals C and D, the equalizer units 4a and 4b perform the above-mentioned processing using the reception data signal A and clock gate signals F and G. As a result of processing, the equalizer units 4a and 4b output the demodulation data signals H and L to the reception data switching unit 5 (FIGS. 2H and 2L). At the same time, the equalizer units 4a and 4b output the demodulation data signals J and K synchronized with the demodulation data signals H and L (FIGS. 2F and 2K).

The reception data switching unit 5 selects the demodulation data signal H or L in accordance with the demodulation data gate signals J and K and outputs the demodulation data signal M (FIG. 2M). At this time, the carrier sensor 2 stops outputting the carrier sense signals C and D upon receiving the demodulation data gate signals J and K.

Since the equalizer units 4a and 4b construct a parallel circuit, these equalizer units can alternately be switched in real time to allow reception processing even if the next frame is received during the carrier sense period. Since the clock gate signals F and G are supplied to the equalizer units 4a and 4b, power consumption can be reduced.

According to the present invention, the two parallel equalizers 41a and 41b in the equalizer units 4a and 4b are alternately switched every frame and operate for reception during only the clock gate period, thereby reducing the power consumption. Real-time processing is allowed even with delays in initial settings for the equalizers in the equalizer units 4a and 4b.

The two parallel equalizers (equalizers in the equalizer units 4a and 4b) are alternately switched every frame reception. Even if a continuous burst signal having a short inactive interval is input, normal processing can be performed in real time. In addition, since the equalizer units 4a and 4b operate for reception during only the carrier sense period, power consumption can be reduced.

What is claimed is:

1. An equalizer circuit comprising:
   carrier sensing means for sensing a start of a reception of a signal on the basis of a signal representing a reception level of the reception signal and outputting a detection signal;
   first and second equalizing means for equalizing the reception signal, said reception signal being simultaneously fed to each of said first and second equalizing means;
   control means for alternately enabling said first and second equalizing means every frame reception in accordance with said detection signal output from said carrier sensing means, said control means including a carrier sense controller for generating first and second carrier sense signals and first and second gate circuits receiving said first and second carrier sense signals respectively, each of said first and second gate circuits receiving a clock signal; and
   switching means for alternately switching between outputs from said first and second equalizing means every frame reception and outputting a selected output of one of said first and second equalizing means as demodulation data.

2. An equalizer circuit according to claim 1, wherein said control means alternately outputs said first and second carrier sense signals to said first and second equalizing means from a time when the detection signal is output from said carrier sensing means to a time when equalizing processing is complete in said first and second equalizing means, and
   said first and second equalizing means alternately equalize the reception signal every frame reception in response to said first and second carrier sense signals from said control means.

3. An equalizer circuit according to claim 2, wherein
   said first and second equalizing means comprise equalizers for setting tap coefficients and memories for storing preamble signals of the reception signal, and
   said first and second equalizing means detect frequency offset values, estimate transmission line characteristics, and set the tap coefficients at the start of reception of the reception signal.

4. An equalizer circuit comprising:
   carrier sensing means for sensing a start of a reception of a signal on the basis of a signal representing a reception level of the reception signal and outputting a detection signal;
   first and second equalizing means for equalizing the reception signal;
   control means for alternately enabling said first and second equalizing means every frame reception in accordance with said detection signal output from said carrier sensing means; and
   switching means for alternately switching between outputs from said first and second equalizing means every frame reception and outputting a selected output of one of said first and second equalizing means as demodulation data;
   wherein said control means alternately outputs first and second carrier sense signals to said first and second equalizing means from a time when the reception signal is output from said carrier sensing means to a time when equalizing processing is complete in said first and second equalizing means, and
   wherein said first and second equalizing means alternately equalize the reception signal every frame reception in response to said first and second carrier sense signals from said control means;
   said equalizer circuit further comprising first and second gate means for receiving a system clock signal and the first and second carrier sense signals from said control means and supplying an output clock signal to said first and second equalizing means.

5. An equalizer circuit according to claim 4, wherein said first and second equalizing means comprise equalizers for setting tap coefficients and memories for storing preamble signals of the reception signal, and said first and second equalizing means detect frequency offset values, estimate transmission line characteristics, and set the tap coefficients at the start of reception of the reception signal.

6. An equalizer circuit comprising:
   carrier sensing means for sensing a start of a reception of a signal on the basis of a signal representing a reception level of the reception signal and outputting a detection signal;
   first and second equalizing means for equalizing the reception signal;
   control means for alternately enabling said first and second equalizing means every frame reception in accordance with said detection signal output from said carrier sensing means; and switching means for alternately switching between outputs from said first and second equalizing means every frame reception and outputting a selected output of one of said first and second equalizing means as demodulation data;

wherein:

said control means alternately outputs first and second carrier sense signals to said first and second equalizing means from a time when the reception signal is output from said carrier sensing means to a time when equalizing processing is complete in said first and second equalizing means;

said first and second equalizing means alternately equalize the reception signal every frame reception in response to said first and second carrier sense signals from said control means said first and second equalizing means output first and second demodulation data used during equalizing processing to said switching means and output first and second demodulation data gate signals synchronized with the first and second demodulation data to said control means and said switching means, said control means stops outputting the first and second carrier sense signals in response to the first and second demodulation data gate signals, and said switching means alternately outputs the first and second demodulation data in response to the first and second demodulation data gate signals.

7. An equalizer circuit according to claim 6, wherein said first and second equalizing means comprise equalizers for setting tap coefficients and memories for storing preamble signals of the reception signal, and said first and second equalizing means detect frequency offset values, estimate transmission line characteristics, and set the tap coefficients at the start of reception of the reception signal.

8. An equalizing method comprising:

detecting a start of a reception signal on the basis of a signal representing a reception level of the reception signal;

simultaneously feeding said reception signal to first and second equalizer units;

alternately enabling said first and second equalizer units for equalizing the reception signal upon detecting the start of the reception signal, said enabling including: (1) generating first and second carrier sense signals and feeding said first and second carrier sense signals to said first and second equalizer units and (2) gating a clock signal and said first and second carrier sense signals and supplying an output clock signal to said first and second equalizer units; and alternately switching between outputs from said first and second equalizer units every frame reception and outputting a selected output of one of said first and second equalizing means of one of said first and second equalizing means as demodulation data.

9. An equalizing method according to claim 8, wherein enabling further comprises alternately outputting the first and second carrier sense signals to enable said first and second equalizer units for a time interval from a time when the start of the reception signal is detected to a time when equalizing processing is complete in said first and second equalizer units.

10. An equalizing method according to claim 8, wherein:

said first and second equalizer units comprise equalizers for setting tap coefficients and memories for storing preamble signals of the reception signal, and said first and second equalizer units detect frequency offset values, estimate transmission line characteristics, and set the tap coefficients at the start of reception of the reception signal.

11. An equalizing method comprising:

detecting a start of a reception signal on the basis of a signal representing a reception level of the reception signal;

simultaneously feeding said reception signal to first and second equalizer units;

alternately enabling said first and second equalizer units for performing equalizing processing of the reception signal upon detecting the start of the reception signal, said enabling including: (1) alternately generating first and second carrier sense signals and feeding the first and second carrier sense signals to said first and second equalizer units and (2) gating a clock signal to said first and second equalizer units;

alternately switching between outputs from said first and second equalizer units every frame reception and outputting a selected output of one of said first and second equalizing means of one of said first and second equalizing means as demodulation data, said first and second carrier sense signals enabling said first and second equalizer units for a time interval from a time when the start of the reception signal is detected to a time when said equalizing processing is complete in said first and second equalizer units; and alternately supplying said clock signal to said first and second equalizer units in accordance with the first and second carrier sense signals.

12. An equalizing method as recited in claim 11 further comprising:

alternately outputting first and second demodulation data used during the equalizing processing in response to first and second demodulation data gate signals produced by said first and second equalizer units respectively.

13. An equalizing method according to claim 12, wherein:

said first and second equalizer units comprise equalizers for setting tap coefficients and memories for storing preamble signals of the reception signal, and said first and second equalizer units detect frequency offset values, estimate transmission line characteristics, and set the tap coefficients at the start of reception of the reception signal.

14. An equalizing method according to claim 11, wherein:

said first and second equalizer units comprise equalizers for setting tap coefficients and memories for storing preamble signals of the reception signal, and said first and second equalizer units detect frequency offset values, estimate transmission line characteristics, and set the tap coefficients at the start of reception of the reception signal.

* * * * *